United States Patent
Igarashi et al.

(10) Patent No.: US 12,445,205 B2
(45) Date of Patent: Oct. 14, 2025

(54) COHERENT OPTICAL RECEPTION DEVICE AND COHERENT OPTICAL RECEPTION METHOD

(71) Applicant: NTT, Inc., Tokyo (JP)

(72) Inventors: Ryo Igarashi, Musashino (JP); Masamichi Fujiwara, Musashino (JP); Takuya Kanai, Musashino (JP)

(73) Assignee: NTT, Inc., Tokyo (JP)

( * ) Notice: Subject to any disclaimer, the term of this patent is extended or adjusted under 35 U.S.C. 154(b) by 142 days.

(21) Appl. No.: 18/026,550

(22) PCT Filed: Sep. 23, 2020

(86) PCT No.: PCT/JP2020/035674
§ 371 (c)(1),
(2) Date: Mar. 15, 2023

(87) PCT Pub. No.: WO2022/064546
PCT Pub. Date: Mar. 31, 2022

(65) Prior Publication Data
US 2023/0344522 A1    Oct. 26, 2023

(51) Int. Cl.
*H04B 10/61* (2013.01)
(52) U.S. Cl.
CPC .................. *H04B 10/61* (2013.01)
(58) Field of Classification Search
CPC .................. H04B 10/61–65; H04B 10/40
See application file for complete search history.

(56) References Cited

U.S. PATENT DOCUMENTS

2019/0020531 A1 *  1/2019  Ge ................ H04L 25/03828

FOREIGN PATENT DOCUMENTS

| WO | WO-2014125531 A1 * | 8/2014 | ............. H04J 14/06 |
| WO | WO-2017212555 A1 * | 12/2017 | ......... H04B 10/2507 |
| WO | WO-2018003095 A1 * | 1/2018 | ............. H04J 14/00 |

OTHER PUBLICATIONS

Nakagawa et al., "Development of Evaluation Platform of AMCC Superimposition on CPRI Signal Transmission for Mobile Fronthaul Network", 2017 European Conference on Optical Communication (ECOC), p. 2. (Year: 2017) (Year: 2017).*
Wang et al., "Demonstration of Auxiliary Management and Control Channel Signal Transmission for FDM Coherent Passive Optical Network", 2023 Opto-Electronics and Communications Conference (OECC), p. 2 (Year: 2023) (Year: 2023).*

(Continued)

*Primary Examiner* — David C Payne

(57) ABSTRACT

A coherent optical reception device includes a coherent receiver that receives signal light in which an AMCC signal is superimposed on a main signal, converts the signal light into an analog electric signal, and outputs an in-phase component and a quadrature-phase component of a reception signal for each polarization state, and a polarization combiner that performs polarization combining on the in-phase component and the quadrature-phase component of the reception signal output from the coherent receiver for each polarization state and outputs the reception signal as an AMCC signal identification reception signal that is the reception signal used for identification of the AMCC signal and a main signal identification reception signal that is the reception signal used for identification of the main signal.

7 Claims, 10 Drawing Sheets

(56) References Cited

OTHER PUBLICATIONS

Zhang et al., "200 Gbit/s/λ PDM-PAM-4 PON system based on intensity modulation and coherent detection", vol. 12, No. 1/Jan. 2020/Journal of Optical Communications and Networking, p. 4 (Year: 2020) (Year: 2020).*
Yoshima et al., "Experimental Investigation of an Optically-superimposed AMCC in 100 Gb/s Coherent WDM-PON for 5G Mobile Fronthaul", 42nd European Conference and Exhibition on Optical Communications, Sep. 18-22, 2016, p. 2 (Year: 2016) (Year: 2016).*
200Gbit_s_PDM-PAM-4_PON_system_based_on_intensity_modulation_and_coherent_detection.pdf (Year: 2020).*
Demonstration_of_Auxiliary_Management_and_Control_Channel_Signal_Transmission.pdf (Year: 2023).*
Development_of_Evaluation_Platform_of_AMCC_Superimposition_on_CPRI_Signal_Transmission.pdf (Year: 2017).*
Experimental_Investigation_of_an_Optically-superimposed_AMCC.pdf (Year: 2016).*
N. Suzuki et al., "Demonstration of 100-Gb/s/λ-Based Coherent WDM-PON System Using New AGC EDFA Based Upstream Preamplifier and Optically Superimposed AMCC Function", IEEE Journal of Lightwave Technology, vol. 35, No. 8, Apr. 15, 2017.

* cited by examiner

COHERENT OPTICAL RECEPTION DEVICE AND COHERENT OPTICAL RECEPTION METHOD

CROSS-REFERENCE TO RELATED APPLICATIONS

This application is a 371 U.S. National Phase of International Application No. PCT/JP2020/035674, filed on Sep. 23, 2020. The entire disclosure of the above application is incorporated herein by reference.

TECHNICAL FIELD

The present invention relates to a coherent optical reception device and a coherent optical reception method.

BACKGROUND ART

In the technology described in Non Patent Literature 1, an auxiliary management and control channel (AMCC) scheme is utilized in a digital coherent transmission system.

CITATION LIST

Non Patent Literature

Non Patent Literature 1: N. Suzuki et al., "Demonstration of 100-Gb/s/λ-Based Coherent WDM-PON System Using New AGC EDFA Based Upstream Preamplifier and Optically Superimposed AMCC Function," IEEE Journal of Lightwave Technology, vol. 35, No. 8, Apr. 15, 2017.

SUMMARY OF INVENTION

Technical Problem

In a case where the AMCC scheme is utilized in the digital coherent transmission system, when separation of a main signal and the AMCC signal is performed at an optical stage by a coupler, a reception light intensity in a coherent receiver decreases (specifically, the light intensity of the main signal entering a photodiode (PD) is attenuated), and noise characteristics deteriorate. In addition, since a device for receiving the AMCC signal is required, the device configuration becomes complicated. Therefore, it is important to implement a method of separating the AMCC signal in a digital signal processor (DSP) stage.

Therefore, an object of the present invention is to provide a technique capable of appropriately separating the superimposed AMCC signal and the main signal at the DSP stage.

Solution to Problem

An aspect of the present invention is a coherent optical reception device including a coherent receiver that receives signal light in which an auxiliary management and control channel (AMCC) signal is superimposed on a main signal, converts the signal light into an analog electric signal, and outputs an in-phase component and a quadrature-phase component of a reception signal for each polarization state, and a polarization combiner that performs polarization combining on the in-phase component and the quadrature-phase component of the reception signal output from the coherent receiver for each polarization state and outputs the reception signal as an AMCC signal identification reception signal that is the reception signal used for identification of the AMCC signal and a main signal identification reception signal that is the reception signal used for identification of the main signal.

An aspect of the present invention is a coherent optical reception device including a coherent receiver that receives signal light in which an auxiliary management and control channel (AMCC) signal is superimposed on a main signal, converts the signal light into an analog electric signal, and outputs an in-phase component and a quadrature-phase component of a reception signal for each polarization state, a polarization combiner that performs polarization combining on the in-phase component and the quadrature-phase component of the reception signal output from the coherent receiver for each polarization state and outputs the reception signal as an AMCC signal identification reception signal that is the reception signal used for identification of the AMCC signal and a main signal identification reception signal that is the reception signal used for identification of the main signal, and a digital signal processor that decodes a code sequence corresponding to the AMCC signal and a code sequence corresponding to the main signal from the reception signal by performing digital signal processing on the reception signal, in which the digital signal processor includes an AMCC signal identificator that identifies the AMCC signal and a main signal identificator that identifies the main signal, the AMCC signal identificator includes an intensity calculator that calculates an absolute value of a complex amplitude as an intensity component of the AMCC signal identification reception signal output from the polarization combiner, and a high frequency component remover that removes a high frequency component included in the intensity component of the AMCC signal identification reception signal calculated by the intensity calculator, and the main signal identificator includes a complex amplitude calculator that calculates a complex amplitude of the main signal identification reception signal output from the polarization combiner, and an equalization processor that performs equalization processing on the main signal identification reception signal.

An aspect of the present invention is a coherent optical reception method including a coherent receiving step of receiving signal light in which an auxiliary management and control channel (AMCC) signal is superimposed on a main signal, converting the signal light into an analog electric signal, and outputting an in-phase component and a quadrature-phase component of a reception signal for each polarization state, and a polarization combining step of performing polarization combining on the in-phase component and the quadrature-phase component of the reception signal output for each polarization state in the coherent receiving step rand outputting the reception signal as an AMCC signal identification reception signal that is the reception signal used for identification of the AMCC signal and a main signal identification reception signal that is the reception signal used for identification of the main signal.

Advantageous Effects of Invention

According to the present invention, it is possible to provide a technique capable of appropriately separating the superimposed AMCC signal and the main signal at the DSP stage.

DESCRIPTION OF EMBODIMENTS

Embodiments of a coherent optical reception device and a coherent optical reception method of the present invention will be described in detail with reference to the drawings.

First Embodiment

Figure 1:
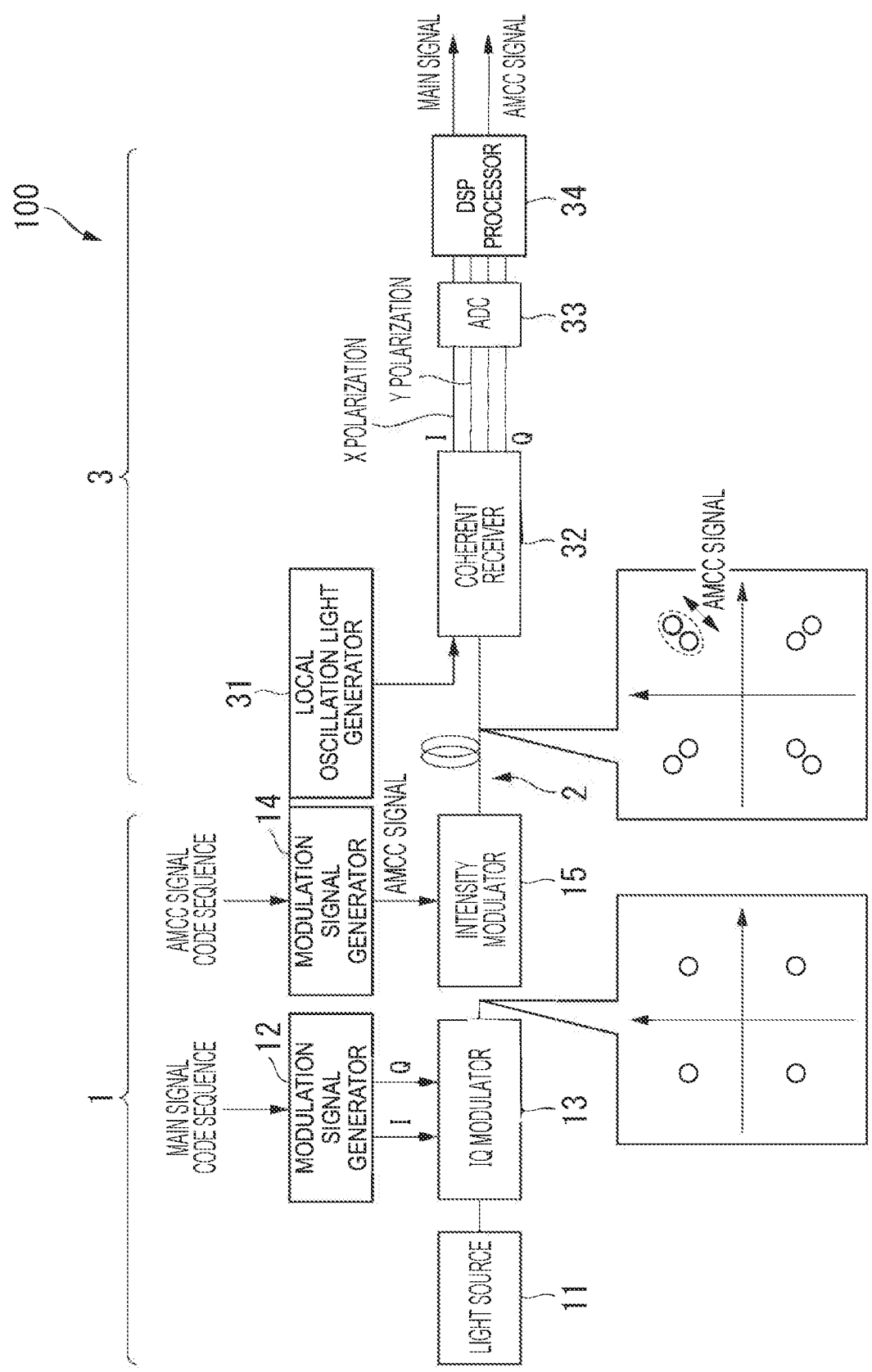
FIG. 1 is a diagram illustrating an example of a coherent optical transmission system to which a coherent optical reception device of a first embodiment is applied.

FIG. 1 is a diagram illustrating an example of a coherent optical transmission system 100 to which a coherent optical reception device 3 of a first embodiment is applied.

In the example illustrated in FIG. 1, the coherent optical transmission system 100 includes a coherent optical transmission device 1, an optical fiber 2, and a coherent optical reception device 3.

The coherent optical transmission device 1 includes a light source 11, a modulation signal generator 12, an IQ modulator 13, a modulation signal generator 14, and an intensity modulator 15.

The light source 11 emits continuous wave light. As the light source 11, for example, a semiconductor laser or the like is used.

A main signal code sequence is input to the modulation signal generator 12. The modulation signal generator 12 generates a modulation signal of the main signal based on the input main signal code sequence. The modulation signal of the main signal includes an I (in-phase) component and a Q (quadrature-phase) component. The modulation signal of the main signal generated by the modulation signal generator 12 is input to the IQ modulator 13.

The IQ modulator 13 performs IQ modulation corresponding to the main signal based on the modulation signal of the main signal input from the modulation signal generator 12. The IQ modulator 13 performs, for example, 4-level quadrature phase shift keying (QPSK) modulation as IQ modulation corresponding to the main signal. The constellation of the signal light output from the IQ modulator 13 is, for example, as illustrated in the lower left of FIG. 1.

The AMCC signal code sequence is input to the modulation signal generator 14. The modulation signal generator 14 generates a modulation signal of the AMCC signal based on the input AMCC signal code sequence. The modulation signal of the AMCC signal generated by the modulation signal generator 14 is input to the intensity modulator 15.

The intensity modulator 15 performs intensity modulation corresponding to the AMCC signal based on the modulation signal of the AMCC signal input from the modulation signal generator 14. As the intensity modulator 15, for example, a Mach-Zehnder modulator, an electro-absorption (EA) modulator, or the like is used. The intensity modulator 15 performs, for example, binary intensity modulation as the intensity modulation corresponding to the AMCC signal. The constellation of the signal light (specifically, signal light output from the coherent optical transmission device 1 and transmitted via the optical fiber 2) output from the intensity modulator 15 is, for example, as illustrated in the lower center of FIG. 1.

In the example illustrated in FIG. 1, the coherent optical transmission device 1 includes the intensity modulator 15, but in another example, the coherent optical transmission device 1 may include an optical amplifier instead of the intensity modulator 15. In this example, the optical amplifier performs intensity modulation by changing the injection current.

In the example illustrated in FIG. 1, the optical fiber 2 functions as a transmission path of the signal light output from the coherent optical transmission device 1.

Figure 2:
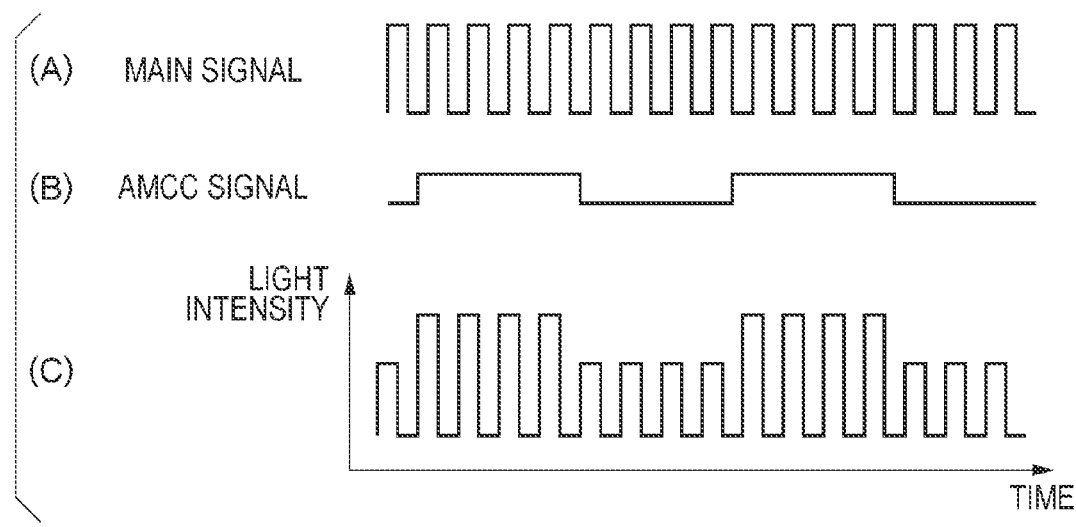
FIG. 2 is a diagram illustrating an example of a time waveform of a light intensity of signal light transmitted by an optical fiber.

FIG. 2 is a diagram illustrating an example of a time waveform of a light intensity of signal light transmitted by the optical fiber 2. Specifically, FIG. 2(A) illustrates an example of the time waveform of the main signal included in the signal light transmitted by the optical fiber 2, FIG. 2(B) illustrates an example of the time waveform of the AMCC signal included in the signal light transmitted by the optical fiber 2, and FIG. 2(C) illustrates an example of the time waveform of the light intensity of the signal light transmitted by the optical fiber 2.

For example, studies on utilization of an AMCC scheme as a channel for exchanging setting information items of a communication device in an optical access system for a mobile device are in progress. The AMCC communication scheme is a scheme in which the AMCC signal (see FIG. 2(B)) having a frequency lower than that of the main signal (see FIG. 2(A)) and a small amplitude is superimposed on the same wavelength as the main signal and transmitted (see FIG. 2(C)).

Digital coherent transmission systems have been put into practical use for longer distances and larger capacities of optical communication systems. In the digital coherent transmission systems, coherent reception is performed by a receiver to acquire not only intensity of signal light but also information of a phase component. In these systems, the influence of thermal noise at the time of photoelectric conversion can be suppressed by coherent detection, and waveform degradation due to transmission and waveform degradation due to device band limitation can be compensated for by digital signal processing (DSP), so that a high loss budget improvement effect can be expected.

In the example illustrated in FIG. 1, the coherent optical reception device 3 receives the signal light output from the coherent optical transmission device 1 and transmitted by the optical fiber 2. The coherent optical reception device 3 includes a local oscillation light generator 31, a coherent receiver 32, an analog-to-digital converter (ADC) 33, and a digital signal processor (DSP processor) 34.

The local oscillation light generator 31 generates local oscillation light.

The coherent receiver 32 receives signal light (that is, the signal light in which the AMCC signal is superimposed on the main signal) transmitted by the optical fiber 2 and converts the optical signal into an analog electric signal. Specifically, the coherent receiver 32 performs coherent reception using the local oscillation light generated by the local oscillation light generator 31, and outputs the in-phase (I) component and the quadrature-phase (Q) component of the reception signal for each polarization state (X polarization or Y polarization).

That is, the signal light received by the coherent receiver 32 is obtained by superimposing the AMCC signal on the main signal by the intensity modulator 15 of the coherent optical transmission device 1 performing the intensity modulation corresponding to the AMCC signal.

The analog-to-digital converter 33 samples (specifically, over-samples) and discretizes the analog electric signal (specifically, the in-phase component and the quadrature-phase component of the reception signal output from the coherent receiver 32 for each polarization state) output from the coherent receiver 32.

The digital signal processor 34 performs digital signal processing on the reception signal discretized by the analog-to-digital converter 33 to decode the code sequence corresponding to the AMCC signal and the code sequence corresponding to the main signal from the reception signal.

Figure 3:
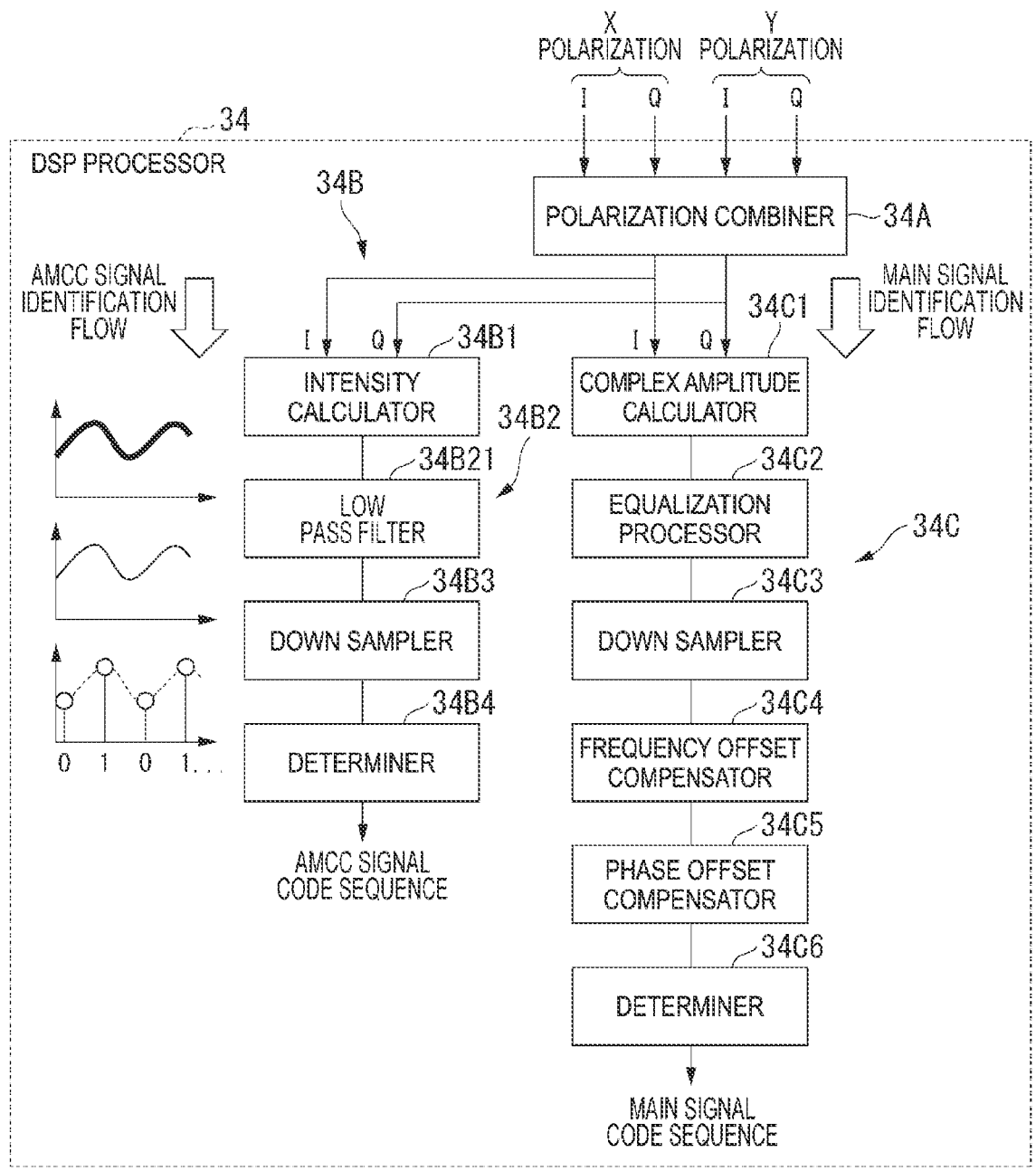
FIG. 3 is a diagram illustrating an example of a detailed configuration of a digital signal processor illustrated in FIG. 2.

FIG. 3 is a diagram illustrating an example of a detailed configuration of the digital signal processor 34 illustrated in FIG. 2.

In the example illustrated in FIG. 3, the digital signal processor 34 includes a polarization combiner 34A, an AMCC signal identificator 34B, and a main signal identificator 34C.

The polarization combiner 34A performs polarization combining on the in-phase component and the quadrature-phase component of the reception signal output from the coherent receiver 32 for each polarization state (specifically, polarization combining on the in-phase component and the quadrature-phase component of the reception signal discretized by the analog-to-digital converter 33). Furthermore, the polarization combiner 34A outputs the reception signal to the AMCC signal identificator 34B as an AMCC signal identification reception signal used for identification of the AMCC signal. In addition, the polarization combiner 34A outputs the reception signal to the main signal identificator 34C as a main signal identification reception signal used for identification of the main signal. That is, as illustrated in FIG. 3, by performing polarization combining, the in-phase component (I signal) and the quadrature-phase component (Q signal) of the signal light are divided into an AMCC signal identification flow and a main signal identification flow.

In the examples illustrated in FIGS. 1 and 3, after sampling is performed by the analog-to-digital converter 33, polarization combining is performed by the polarization combiner 34A of the digital signal processor 34, but in other examples, polarization combining may be performed using a polarization controller (not illustrated) in an optical stage (that is, a stage before the optical signal is converted into the analog electric signal.).

In the example illustrated in FIG. 3, the main signal identificator 34C identifies the main signal. The main signal identificator 34C includes a complex amplitude calculator 34C1, an equalization processor 34C2, a down sampler 34C3, a frequency offset compensator 34C4, a phase offset compensator 34C5, and a determiner 34C6.

The complex amplitude calculator 34C1 calculates the complex amplitude of the reception signal (specifically, the main signal identification reception signal output from the polarization combiner 34A). Assuming that the amplitude of the I signal is $E_I$ and the amplitude of the Q signal is $E_Q$, a complex amplitude E of the reception signal is expressed by the following equation.

$$E=(E_I^2+E_Q^2)^{1/2}\exp j(\tan^{-1}(E_Q/E_I))$$

Here, $(E_I^2+E_Q^2)^{1/2}$ is an absolute value.

The equalization processor 34C2 performs normal equalization processing (for example, transmission, compensation for waveform distortion by a transceiver, or the like) in the digital coherent transmission system. Specifically, the equalization processor 34C2 performs equalization processing on the main signal identification reception signal output from the polarization combiner 34A (that is, the equalization processing using the main signal identification reception signal output from the polarization combiner 34A).

In a case where a general constant modulus algorithm (CMA) is applied as the equalization processing, the AMCC signal component that is a low-speed intensity modulation component is removed in the equalization processing.

Figure 4:
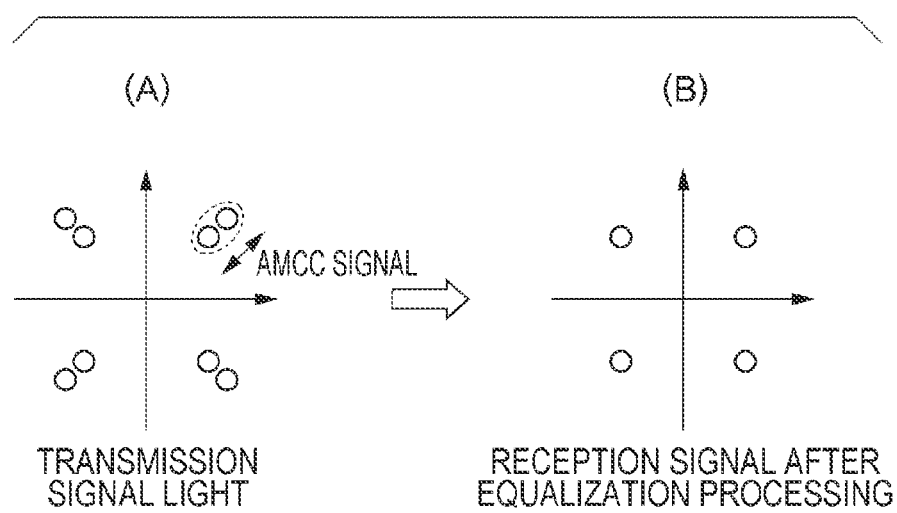
FIG. 4 is a diagram illustrating a comparison between a constellation of a signal before equalization processing is performed and a constellation of a signal after equalization processing is performed.

FIG. 4 is a diagram illustrating a comparison between a constellation of a signal before equalization processing is performed and a constellation of a signal after transmission processing is performed. Specifically, FIG. 4(A) illustrates the constellation of the signal before the equalization processing is performed (that is, the transmission signal light in which the AMCC signal is superimposed on the main signal), and FIG. 4(B) illustrates the constellation of the reception signal after the equalization processing is performed.

As illustrated in FIG. 4, the AMCC signal component which is the low-speed intensity modulation component (see FIG. 4(A)) is removed in the equalization processing. Therefore, the AMCC signal cannot be identified from the constellation of the reception signal (that is, the constellation of the reception signal illustrated in FIG. 4(B)) after the DSP processing (that is, after the equalization processing by the equalization processor of the digital signal processor). Therefore, in the coherent optical reception device 3 of the first embodiment, the AMCC signal (specifically, the AMCC signal identification reception signal) is separated from the main signal (specifically, the main signal identification reception signal) in a previous stage of the equalization processing (that is, the polarization combiner 34A of the digital signal processor 34).

In the example illustrated in FIG. 3, the down sampler 34C3 performs normal down-sampling (for example, removal of high frequency noise by a low pass filter, thinning processing, and the like) in the digital coherent transmission system.

The frequency offset compensator 34C4 performs normal frequency offset compensation (for example, processing of removing a frequency offset between the light source 11 of the coherent optical transmission device 1 and the local oscillation light source of the local oscillation light generator 31 of the coherent optical reception device 3) in the digital coherent transmission system.

The phase offset compensator 34C5 performs normal phase offset compensation (for example, processing of removing a phase noise between the light source 11 of the coherent optical transmission device 1 and the local oscillation light source of the local oscillation light generator 31 of the coherent optical reception device 3) in the digital coherent transmission system.

The determiner 34C6 performs normal threshold determination in the digital coherent transmission system, and outputs a main signal code sequence.

In the example illustrated in FIG. 3, the AMCC signal identificator 34B identifies the AMCC signal. The AMCC signal identificator 34B includes an intensity calculator 34B1, a high frequency component remover 34B2, a down sampler 34B3, and a determiner 34B4.

The intensity calculator 34B1 calculates an absolute value of the complex amplitude as an intensity component of the reception signal. Specifically, the intensity calculator 34B1 calculates the absolute value of the complex amplitude as the intensity component using the AMCC signal identification reception signal output from the polarization combiner 34A. The waveform of the intensity component output from the intensity calculator 34B1 is, for example, as illustrated in the upper left of FIG. 3.

The high frequency component remover 34B2 removes a high frequency component (high frequency noise) included in the intensity component of the AMCC signal identification reception signal calculated by the intensity calculator 34B1 (that is, the intensity component output from the intensity calculator 34B1). The high frequency component remover 34B2 removes a high frequency component included in the intensity component of the AMCC signal identification reception signal using the low pass filter 34B21. As the low pass filter 34B21, for example, a finite impulse response (FIR) filter is used.

The waveform of the intensity component output from the high frequency component remover 34B2 (that is, the waveform of the intensity component after the high frequency component is removed) is, for example, as illustrated in the left center of FIG. 3.

The down sampler 34B3 extracts a symbol by performing down-sampling on the intensity component from which the high frequency component has been removed by the high frequency component remover 34B2. The symbol output from the down sampler 34B3 is, for example, as illustrated in the lower left of FIG. 3.

The determiner 34B4 demodulates the code sequence of the AMCC signal included in the signal light received by the coherent receiver 32 by performing threshold determination.

As described above, in the examples illustrated in FIGS. 1 to 3, the AMCC signal is superimposed on the main signal as the intensity modulation by the intensity modulator 15 of the coherent optical transmission device 1.

In addition, the coherent optical reception device 3 separates the AMCC signal at the DSP stage. That is, by the polarization combiner 34A of the digital signal processor 34, the reception signal is output to the AMCC signal identificator 34B as the AMCC signal identification reception signal used for identification of the AMCC signal, and the reception signal is output to the main signal identificator 34C as the main signal identification reception signal used for identification of the main signal.

Furthermore, after the polarization combining is performed by the polarization combiner 34A of the digital signal processor 34, using the absolute value of the complex amplitude of the reception signal that has not undergone the adaptive equalization processing by the equalization processor 34C2 of the main signal identificator 34C (specifically, the AMCC signal identification reception signal), the intensity calculator 34B1 of the AMCC signal identificator 34B monitors the change in the reception signal intensity, and the determiner 34B4 of the AMCC signal identificator 34B demodulates the code sequence of the AMCC signal.

The coherent optical reception device 3 can be configured using a processor such as a central processing unit (CPU) and a memory. The coherent optical reception device 3 functions as the polarization combiner 34A, the AMCC signal identificator 34B, the main signal identificator 34C, and the like of the digital signal processor 34 by the processor executing a program. All or some of the functions of the coherent optical reception device 3 may be realized by using hardware such as an application specific integrated circuit (ASIC), a programmable logic device (PLD), or a field programmable gate array (FPGA). The program may be recorded in a computer-readable recording medium. The computer-readable recording medium is, for example, a portable medium such as a flexible disk, a magneto-optical disc, a ROM, a CD-ROM, or a semiconductor storage device (for example, a solid state drive (SSD)), or a storage device such as a hard disk or a semiconductor storage device built in a computer system. The program may be transmitted via an electric communication line.

In the coherent optical reception device 3 of the first embodiment, before the equalization processing is performed, the polarization combiner 34A performs polarization combining on the in-phase component and the quadrature-phase component of the reception signal output from the coherent receiver 32 for each polarization state, and the reception signal is output to the AMCC signal identificator 34B as the AMCC signal identification reception signal and is output to the main signal identificator 34C as the main signal identification reception signal. Therefore, in the equalization processing, it is possible to demodulate the AMCC signal code sequence while avoiding removal of the AMCC signal component from the reception signal used for demodulating the AMCC signal code sequence.

That is, according to the coherent optical reception device 3 of the first embodiment, it is possible to appropriately separate the AMCC signal and the main signal superimposed in the coherent optical transmission device 1.

Figure 5:
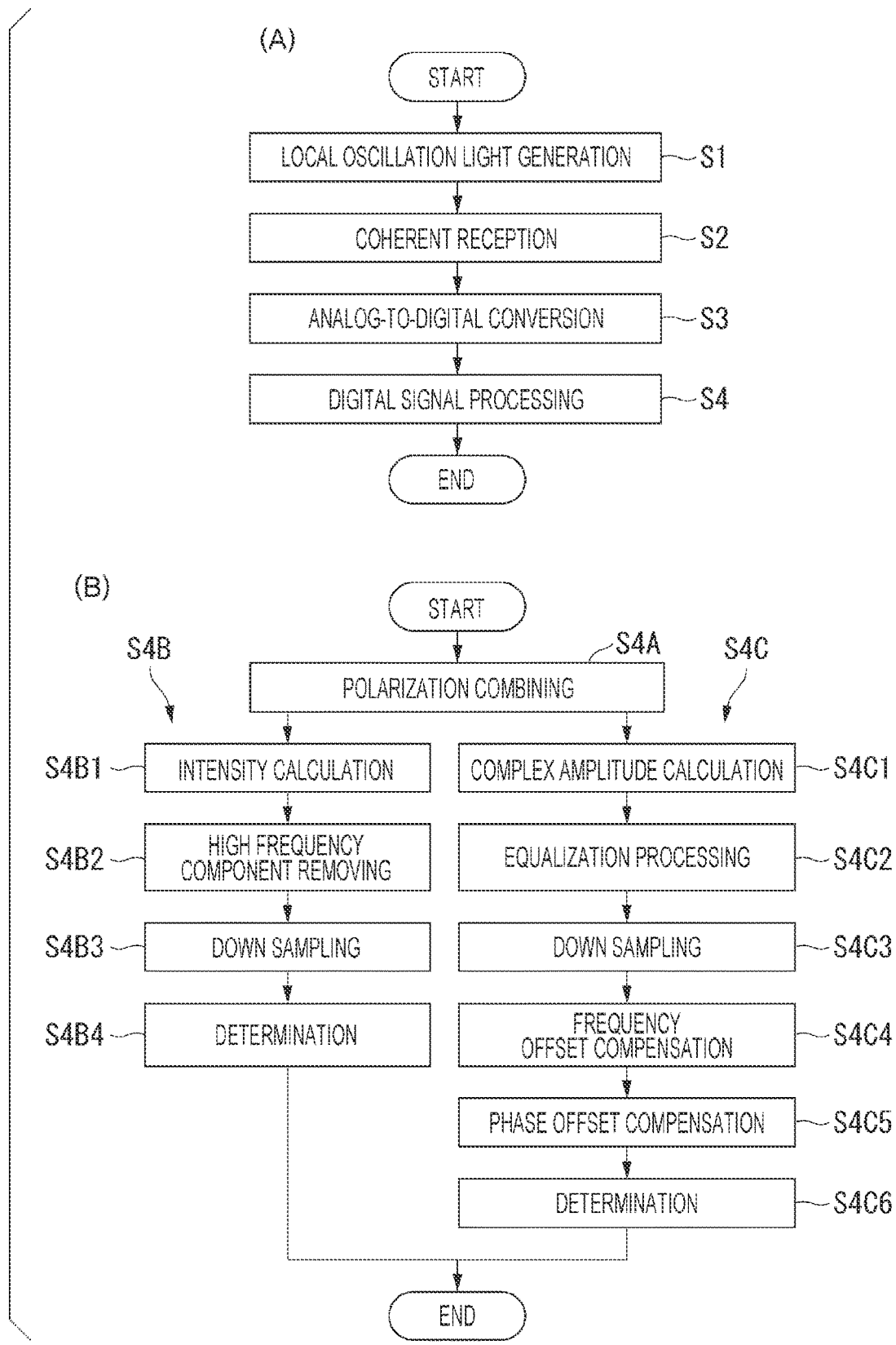
FIG. 5 is a flowchart for illustrating an example of processing executed in the coherent optical reception device of the first embodiment.

FIG. 5 is a flowchart for illustrating an example of processing executed in the coherent optical reception device 3 of the first embodiment. Specifically, FIG. 5(A) illustrates main processing executed in the coherent optical reception device 3 of the first embodiment, and FIG. 5(B) illustrates processing executed in step S4 of FIG. 5(A).

In the example illustrated in FIG. 5, in step S1, the local oscillation light generator 31 generates local oscillation light.

Next, in step S2, the coherent receiver 32 receives signal light transmitted by the optical fiber 2 (that is, the signal light in which the AMCC signal is superimposed on the main signal), converts the optical signal into an analog electric signal, and outputs the in-phase component and the quadrature-phase component of the reception signal for each polarization state. Specifically, in step S2, the coherent receiver 32 performs coherent reception using the local oscillation light generated in step S1.

Next, in step S3, the analog-to-digital converter 33 samples and discretizes the analog electric signal output from the coherent receiver 32 (that is, performs analog-to-digital conversion).

Next, in step S4, the digital signal processor 34 performs digital signal processing on the reception signal discretized in step S3 to decode the code sequence corresponding to the AMCC signal and the code sequence corresponding to the main signal from the reception signal.

Specifically, in step S4A, the polarization combiner 34A performs polarization combining on the in-phase component and the quadrature-phase component of the reception signal discretized in step S3, outputs the reception signal to the AMCC signal identificator 34B as the AMCC signal identification reception signal, and outputs the reception signal to the main signal identificator 34C as a main signal identification reception signal.

Next, in step S4C, the main signal identificator 34C identifies the main signal using the main signal identification reception signal.

Specifically, in step S4C1, the complex amplitude calculator 34C1 calculates the complex amplitude of the reception signal. Specifically, in step S4C1, the complex amplitude calculator 34C1 calculates the complex amplitude of the main signal identification reception signal output in step S4A.

Next, in step S4C2, the equalization processor 34C2 performs normal equalization processing in the digital coherent transmission system. Specifically, in step S4C2, the equalization processor 34C2 performs equalization processing on the main signal identification reception signal.

Next, in step S4C3, the down sampler 34C3 performs normal down-sampling in the digital coherent transmission system.

Next, in step S4C4, the frequency offset compensator 34C4 performs normal frequency offset compensation in the digital coherent transmission system.

Next, in step S4C5, the phase offset compensator 34C5 performs normal phase offset compensation in the digital coherent transmission system.

Next, in step S4C6, the determiner 34C6 performs normal threshold determination in the digital coherent transmission system, and outputs a main signal code sequence.

In step S4B, in parallel with the processing in step S4C, the AMCC signal identificator 34B identifies the AMCC signal using the AMCC signal identification reception signal.

Specifically, in step S4B1, the intensity calculator 34B1 calculates the absolute value of the complex amplitude as the intensity component of the reception signal. Specifically, in step S4B1, the intensity calculator 34B1 calculates the absolute value of the complex amplitude as the intensity component of the AMCC signal identification reception signal output in step S4A.

Next, in step S4B2, the high frequency component remover 34B2 removes a high frequency component (high frequency noise) included in the intensity component (specifically, the intensity component of the AMCC signal identification reception signal) of the reception signal calculated in step S4B1.

Next, in step S4B3, the down sampler 34B3 performs down-sampling on the intensity component from which the high frequency component has been removed in step S4B2.

Next, in step S4B4, the determiner 34B4 performs threshold determination to demodulate the code sequence of the AMCC signal.

Second Embodiment

Hereinafter, a second embodiment of a coherent optical reception device and a coherent optical reception method of the present invention will be described.

The coherent optical reception device 3 of the second embodiment is configured similarly to the coherent optical reception device 3 of the first embodiment described above except for the points described later. Therefore, according to the coherent optical reception device 3 of the second embodiment, it is possible to achieve the same effects as those of the coherent optical reception device 3 of the first embodiment described above except for the points described later.

Figure 6:
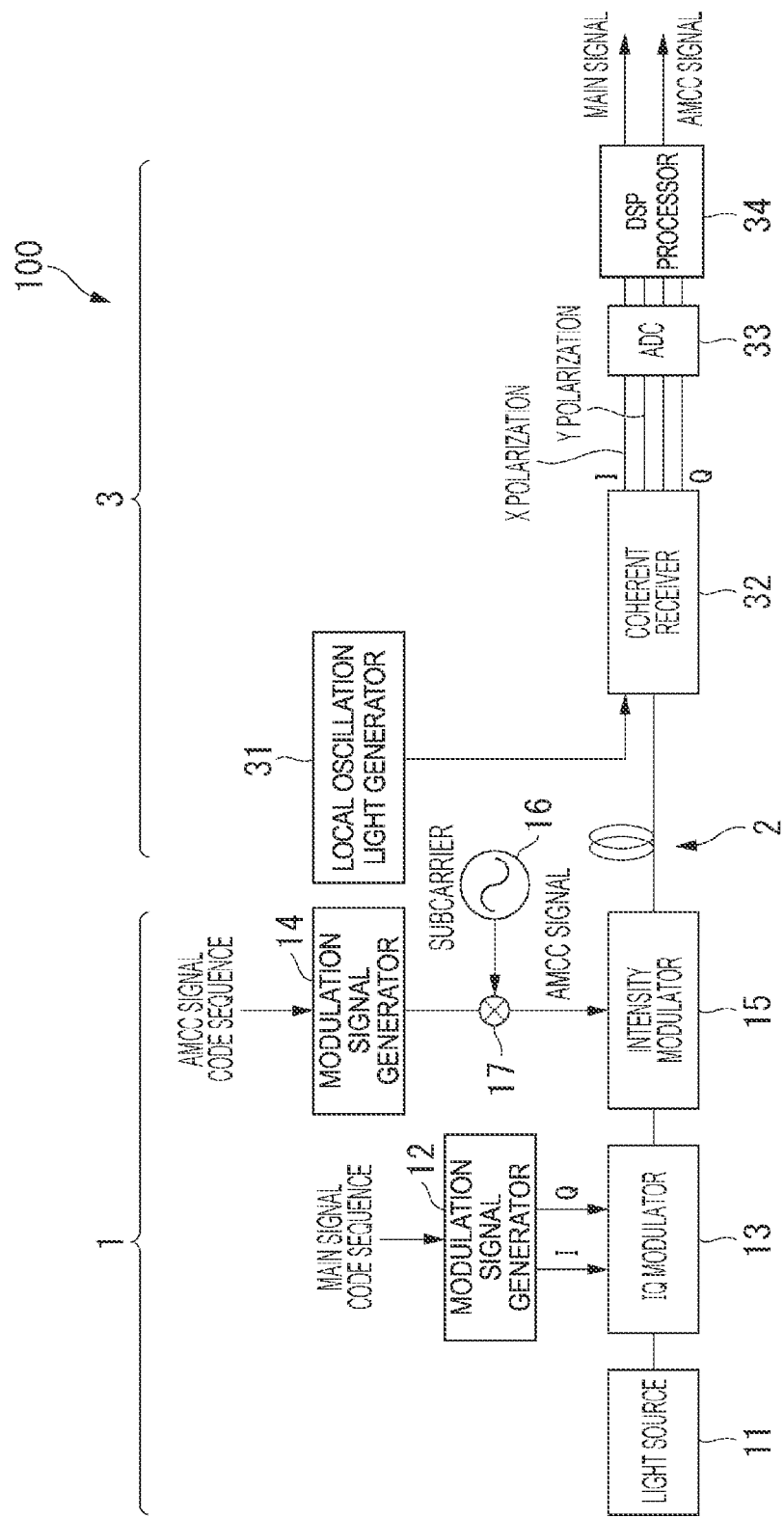
FIG. 6 is a diagram illustrating an example of a coherent optical transmission system to which a coherent optical reception device of a second embodiment is applied.

FIG. 6 is a diagram illustrating an example of a coherent optical transmission system 100 to which a coherent optical reception device 3 of the second embodiment is applied.

In the example illustrated in FIG. 6, the coherent optical transmission system 100 includes the coherent optical transmission device 1, the optical fiber 2, and the coherent optical reception device 3.

The coherent optical transmission device 1 includes a light source 11, a modulation signal generator 12, an IQ modulator 13, a modulation signal generator 14, an intensity modulator 15, a subcarrier generator 16, and a multiplicator 17.

Depending on the configuration of the coherent optical reception device 3, the coherent optical reception device 3 may remove a DC component.

Therefore, in the example illustrated in FIG. 6, the coherent optical transmission device 1 includes the subcarrier generator 16. The subcarrier generator 16 generates a subcarrier.

In the example illustrated in FIG. 6, the multiplicator 17 multiplies the modulation signal of the AMCC signal generated by the modulation signal generator 14 by the subcarrier generated by the subcarrier generator 16.

A signal obtained by multiplying the modulation signal of the AMCC signal by the subcarrier by the multiplicator 17 is input to the intensity modulator 15. The intensity modulator 15 performs intensity modulation corresponding to the AMCC signal based on a result of multiplying the modulation signal of the AMCC signal by the subcarrier.

That is, in the coherent optical transmission system 100 to which the coherent optical reception device 3 of the second embodiment is applied, the signal light received by the coherent receiver 32 of the coherent optical reception device 3 is obtained by multiplying the AMCC signal by the subcarrier by the multiplicator 17, and performing the intensity modulation corresponding to the AMCC signal by the intensity modulator 15, whereby the AMCC signal is superimposed on the main signal.

Figure 7:
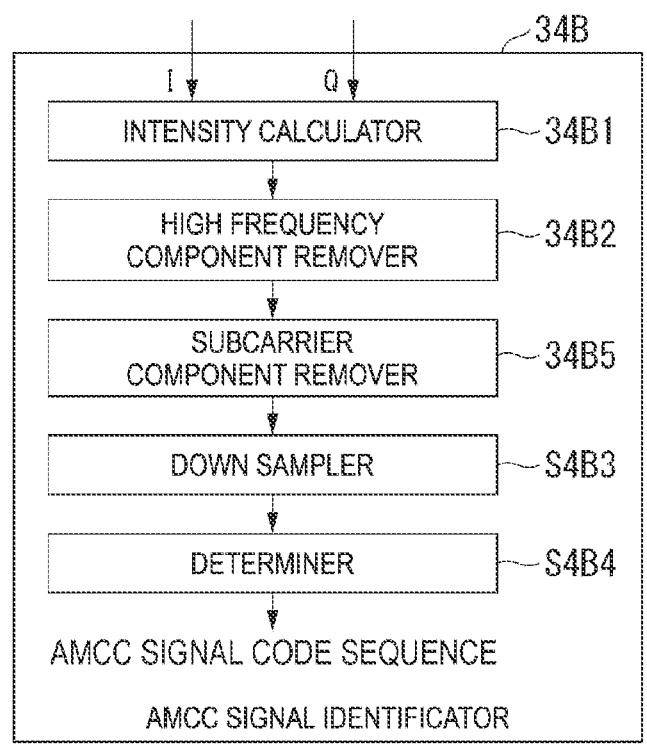
FIG. 7 is a diagram illustrating an example of a configuration of an AMCC signal identificator of a coherent optical reception device of a second embodiment.

FIG. 7 is a diagram illustrating an example of a configuration of an AMCC signal identificator 34B of the coherent optical reception device 3 of the second embodiment.

In the example illustrated in FIG. 7, the AMCC signal identificator 34B includes an intensity calculator 34B1, a high frequency component remover 34B2, a down sampler 34B3, a determiner 34B4, and a subcarrier component remover 34B5.

The subcarrier component remover 34B5 removes a subcarrier component (corresponding to a subcarrier generated by the subcarrier generator 16) included in the AMCC signal identification reception signal input to the AMCC signal identificator 34B.

Figure 8:
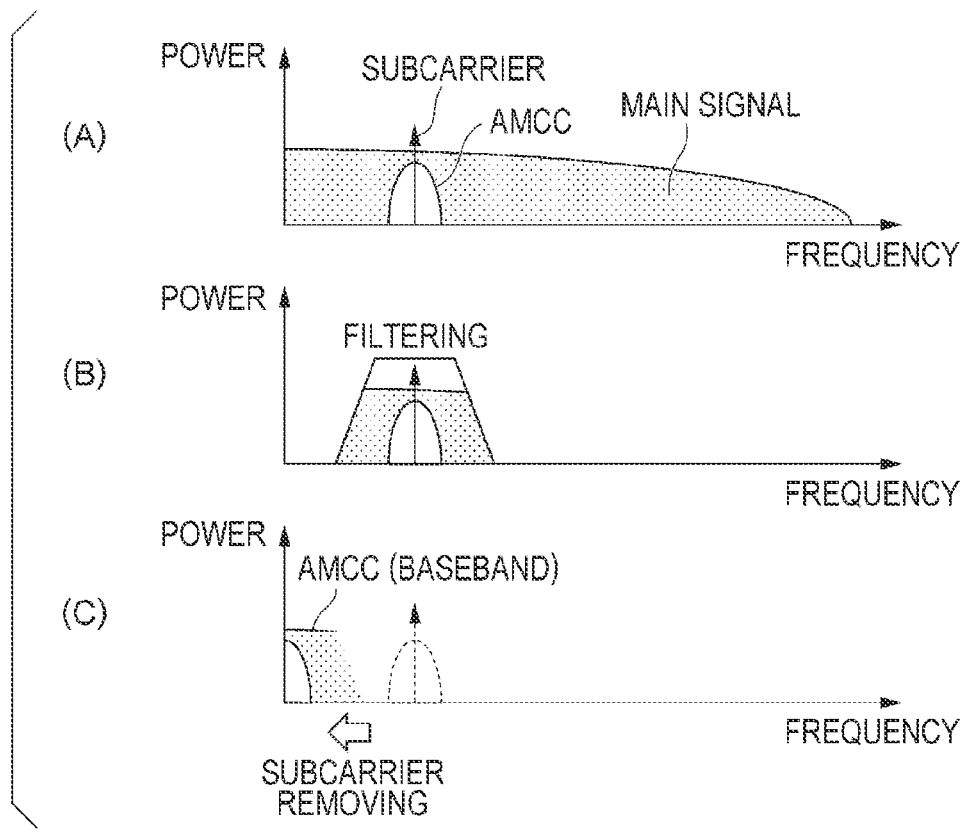
FIG. 8 is a diagram for illustrating an example of a spectrum of a light intensity waveform of an AMCC signal identification reception signal input to an AMCC signal identificator.

FIG. 8 is a diagram for illustrating an example of a spectrum of a light intensity waveform of the AMCC signal identification reception signal input to the AMCC signal identificator 34B. Specifically, FIG. 8(A) illustrates an example of the spectrum of the light intensity waveform of the AMCC signal identification reception signal input to the AMCC signal identificator 34B (that is, the spectrum of the light intensity waveform of the AMCC signal identification reception signal input to the intensity calculator 34B1 of the AMCC signal identificator 34B), FIG. 8(B) illustrates an example of the spectrum of the light intensity waveform of the AMCC signal identification reception signal after the high frequency component remover 34B2 removes the high frequency component, and FIG. 8(C) illustrates an example of the spectrum of the light intensity waveform of the AMCC signal identification reception signal after the subcarrier component remover 34B5 removes the subcarrier component.

In the examples illustrated in FIGS. 7 and 8, the AMCC signal identification reception signal input to the intensity calculator 34B1 of the AMCC signal identificator 34B includes not only the main signal and the AMCC signal but also the subcarrier component (see FIG. 8(A)).

The high frequency component remover 34B2 removes high frequency noise (main signal component) included in the intensity component of the AMCC signal identification reception signal calculated by the intensity calculator 34B1, for example, using the low pass filter 34B21. That is, as illustrated in FIG. 8(B), the main signal component is reduced by the high frequency component remover 34B2, and only the subcarrier component and the AMCC signal are extracted.

The subcarrier component remover 34B5 removes the subcarrier component by performing envelope detection or the like, for example, and drops the AMCC signal to baseband as illustrated in FIG. 8(C).

The down sampler 34B3 performs down-sampling on the AMCC signal identification reception signal after the subcarrier component remover 34B5 removes the subcarrier component.

The determiner 34B4 performs threshold determination after the subcarrier component remover 34B5 removes the subcarrier component. That is, the determiner 34B4 demodulates the code sequence of the AMCC signal included in the signal light received by the coherent receiver 32 of the coherent optical reception device 3 of the second embodiment by performing threshold determination.

Third Embodiment

Hereinafter, a third embodiment of a coherent optical reception device and a coherent optical reception method of the present invention will be described.

The coherent optical reception device 3 of the third embodiment is configured similarly to the coherent optical reception device 3 of the first embodiment described above except for the points described later. Therefore, according to the coherent optical reception device 3 of the third embodiment, it is possible to achieve the same effects as those of the coherent optical reception device 3 of the first embodiment described above except for the points described later.

Figure 9:
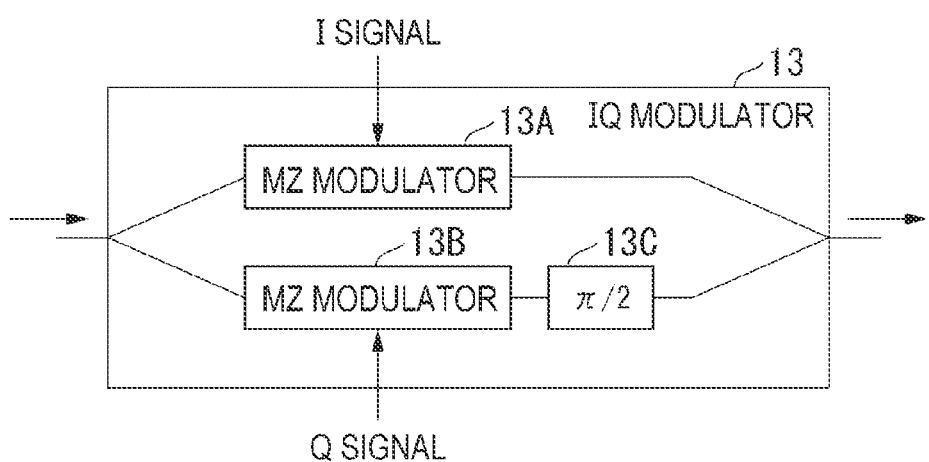
FIG. 9 is a diagram illustrating an example of an IQ modulator of a coherent optical transmission device included in a coherent optical transmission system to which a coherent optical reception device of a third embodiment is applied.

FIG. 9 is a diagram illustrating an example of the IQ modulator 13 of the coherent optical transmission device 1 included in a coherent optical transmission system 100 to which the coherent optical reception device 3 of the third embodiment is applied.

As described above, in the example illustrated in FIG. 1, the coherent optical transmission device 1 includes the intensity modulator 15 that performs intensity modulation corresponding to the AMCC signal, separately from the IQ modulator 13.

On the other hand, in the example illustrated in FIG. 9, the IQ modulator 13 performs IQ modulation corresponding to the main signal and performs intensity modulation corresponding to the AMCC signal. That is, the intensity modulation corresponding to the AMCC signal is performed in the IQ modulator 13 on which the IQ modulation corresponding to the main signal is performed. The IQ modulator 13 includes a Mach-Zehnder (MZ) modulator 13A, a Mach-Zehnder (MZ) modulator 13B, and a π/2 phase difference setter 13C. Light is received to the IQ modulator 13 from a light source 11 (see FIG. 1). The received light is separated into two paths, one of the separated light is received to the Mach-Zehnder modulator 13A, and the other of the separated light is input to the Mach-Zehnder modulator 13B.

The I signal (the in-phase component of the modulation signal of the main signal) is applied to the Mach-Zehnder modulator 13A. The Mach-Zehnder modulator 13A modulates the intensity and the phase of the light received from light source 11 based on the applied I signal (the in-phase component of the modulation signal of the main signal), and emits the light in which the intensity and the phase are modulated.

The Q signal (the quadrature-phase component of a modulation signal of the main signal) is applied to the Mach-Zehnder modulator 13B. The Mach-Zehnder modulator 13B modulates the intensity and the phase of the light received from light source 11 based on the applied Q signal (the quadrature-phase component of the modulation signal of the main signal), and emits the light in which the intensity and the phase are modulated to π/2 phase difference setter 13C.

The π/2 phase difference setter 13C provides a phase difference of π/2 between the path of the light emitted from the Mach-Zehnder modulator 13A and the path of the light emitted from the Mach-Zehnder modulator 13B.

Figure 10:
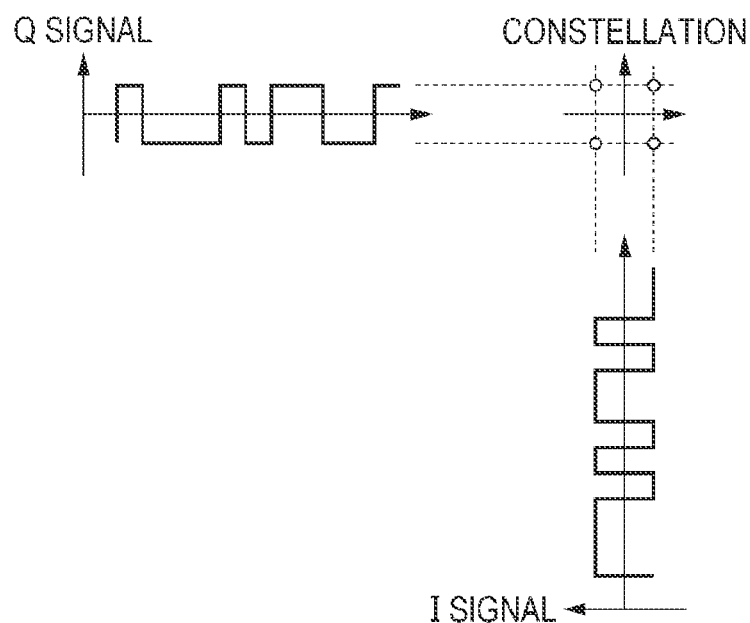
FIG. 10 is a diagram illustrating a relationship among an I signal, a Q signal, and a constellation.

FIG. 10 is a diagram illustrating a relationship among the I signal, the Q signal, and the constellation.

By providing a phase difference of π/2 between the path of the light emitted from the Mach-Zehnder modulator 13A and the path of the light emitted from the Mach-Zehnder modulator 13B, the π/2 phase difference setter 13C can associate the I component and the Q component on the constellation with the I signal applied to the Mach-Zehnder modulator 13A and the Q signal applied to the Mach-Zehnder modulator 13B as illustrated in FIG. 10.

Figure 11:
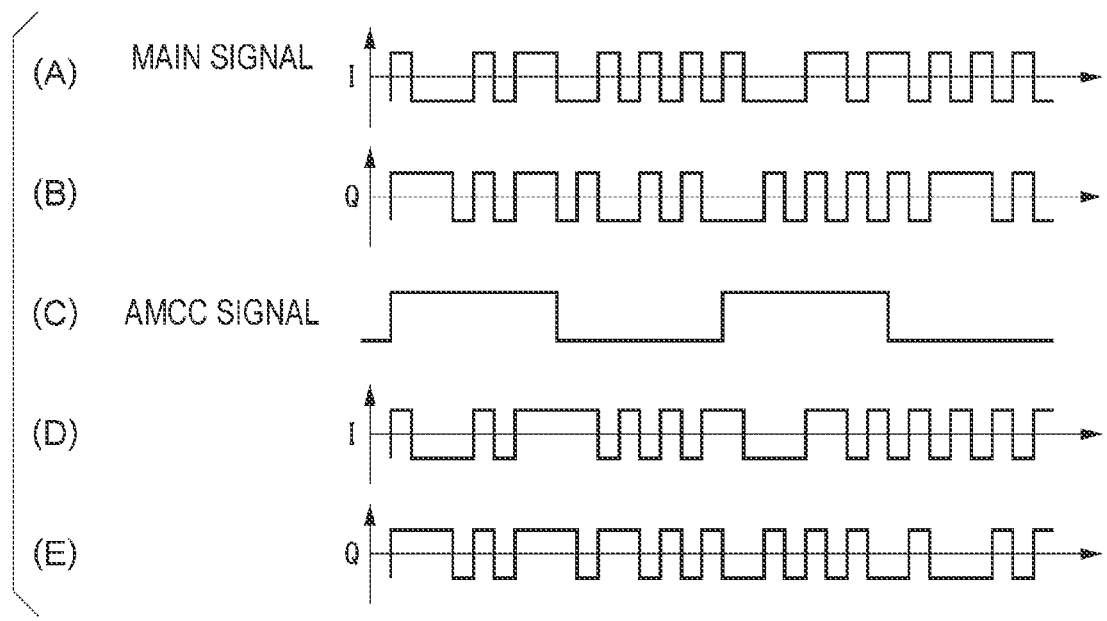
FIG. 11 is a diagram for illustrating a modulation signal to the IQ modulator of the coherent optical transmission device included in the coherent optical transmission system to which the coherent optical reception device of the third embodiment is applied.

FIG. 11 is a diagram for illustrating a modulation signal to the IQ modulator 13 of the coherent optical transmission device 1 included in the coherent optical transmission system 100 to which the coherent optical reception device 3 of the third embodiment is applied.

Specifically, FIG. 11(A) illustrates a time waveform of the in-phase (I) component of the modulation signal of the main signal, FIG. 11(B) illustrates a time waveform of the quadrature-phase (Q) component of the modulation signal of the main signal, and FIG. 11(C) illustrates a time waveform of the AMCC signal. The AMCC signal is a binary signal that takes 1 or 0.

FIG. 11(D) illustrates a signal in which the sign is the same as the in-phase component of the modulation signal of the main signal illustrated in FIG. 11(A) in the section in which the AMCC signal illustrated in FIG. 11(C) is 1, and the sign is opposite to the in-phase component of the modulation signal of the main signal illustrated in FIG. 11(A) in the section in which the AMCC signal illustrated in FIG. 11(C) is 0.

FIG. 11(E) illustrates a signal in which the sign is the same as the quadrature-phase component of the modulation signal of the main signal illustrated in FIG. 11(B) in the section in which the AMCC signal illustrated in FIG. 11(C) is 1, and the sign is opposite to the quadrature-phase component of the modulation signal of the main signal illustrated in FIG. 11(B) in the section in which the AMCC signal illustrated in FIG. 11(C) is 0.

At this time, in a case where the in-phase component of the modulation signal of the main signal illustrated in FIG. 11(A) and the signal illustrated in FIG. 11(D) are superimposed on each other to be the modulation signal to the Mach-Zehnder modulator 13A of the IQ modulator 13, and the in-phase component of the modulation signal of the main signal illustrated in FIG. 11(B) and the signal illustrated in FIG. 11(E) are superimposed on each other to be the modulation signal to the Mach-Zehnder modulator 13B of the IQ modulator 13, the signal light including both the components of the main signal and the AMCC signal can be generated only by one IQ modulator 13.

That is, the signal light received by the coherent receiver 32 of the coherent optical reception device 3 of the third embodiment is obtained by superimposing the AMCC signal on the main signal by performing the intensity modulation corresponding to the AMCC signal, similarly to the signal light received by the coherent receiver 32 of the coherent optical reception device 3 of the first embodiment.

In the coherent optical transmission system 100 to which the coherent optical reception device 3 of the first embodiment is applied, the intensity modulation corresponding to the AMCC signal is performed in the intensity modulator 15, whereas in the coherent optical transmission system 100 to which the coherent optical reception device 3 of the third embodiment is applied, the intensity modulation corresponding to the AMCC signal is performed in the IQ modulator 13 on which the IQ modulation corresponding to the main signal is performed.

Fourth Embodiment

Hereinafter, a fourth embodiment of a coherent optical reception device and a coherent optical reception method of the present invention will be described.

The coherent optical reception device 3 of the fourth embodiment is configured similarly to the coherent optical reception device 3 of the first embodiment described above except for the points described later. Therefore, according to the coherent optical reception device 3 of the fourth embodiment, it is possible to achieve the same effects as those of the coherent optical reception device 3 of the first embodiment described above except for the points described later.

Figure 12:
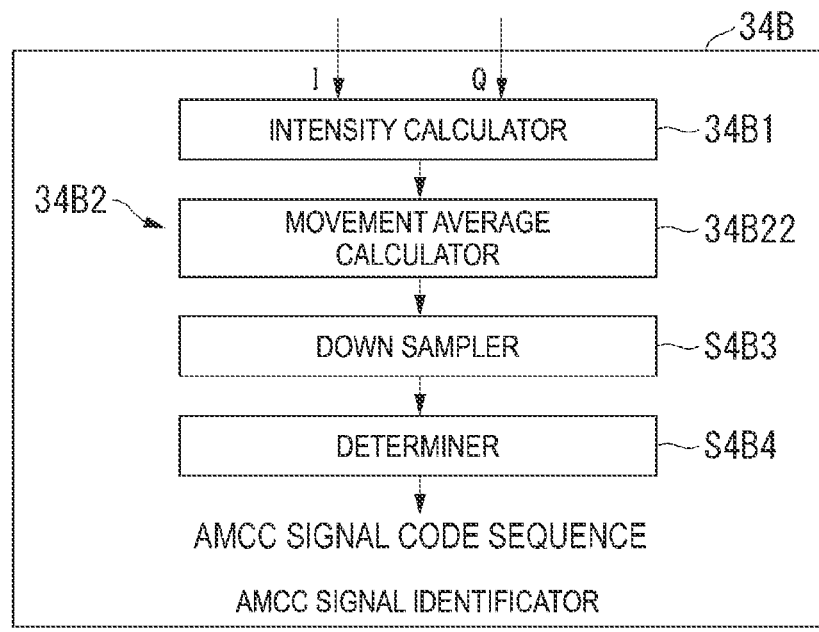
FIG. 12 is a diagram illustrating an example of a configuration of an AMCC signal identificator of a coherent optical reception device of a fourth embodiment.

FIG. 12 is a diagram illustrating an example of a configuration of an AMCC signal identificator 34B of the coherent optical reception device 3 of the fourth embodiment.

In the example illustrated in FIG. 12, similar to the example illustrated in FIG. 1, the AMCC signal identificator 34B includes the intensity calculator 34B1, the high frequency component remover 34B2, a down sampler 34B3, and a determiner 34B4.

As described above, in the example illustrated in FIG. 1, the high frequency component remover 34B2 removes a high frequency component included in the intensity component of the AMCC signal identification reception signal using the low pass filter 34B21.

On the other hand, in the example illustrated in FIG. 12, the high frequency component remover 34B2 removes the high frequency component included in the intensity component of the AMCC signal identification reception signal using the movement average calculated by the movement average calculator 34B22.

That is, in the coherent optical reception device 3 of the fourth embodiment, a high frequency noise reduction method using a movement average is used to reduce the amount of calculation.

In the example illustrated in FIG. 12, the light intensity of the reception signal output from the intensity calculator 34B1 is I(n). The movement average $I_{ave}(n)$ calculated by the movement average calculator 34B22 is expressed by Equation (1) below.

As the averaging number N is increased, the noise component can be suppressed, but in a case where the average section exceeds the section of the same symbol of the AMCC signal, the AMCC signal component decreases, and the effect decreases.

[Math. 1]

$$I_{ave}(n) = \Sigma_{i=n}^{N} I(i) \tag{1}$$

Figure 13:
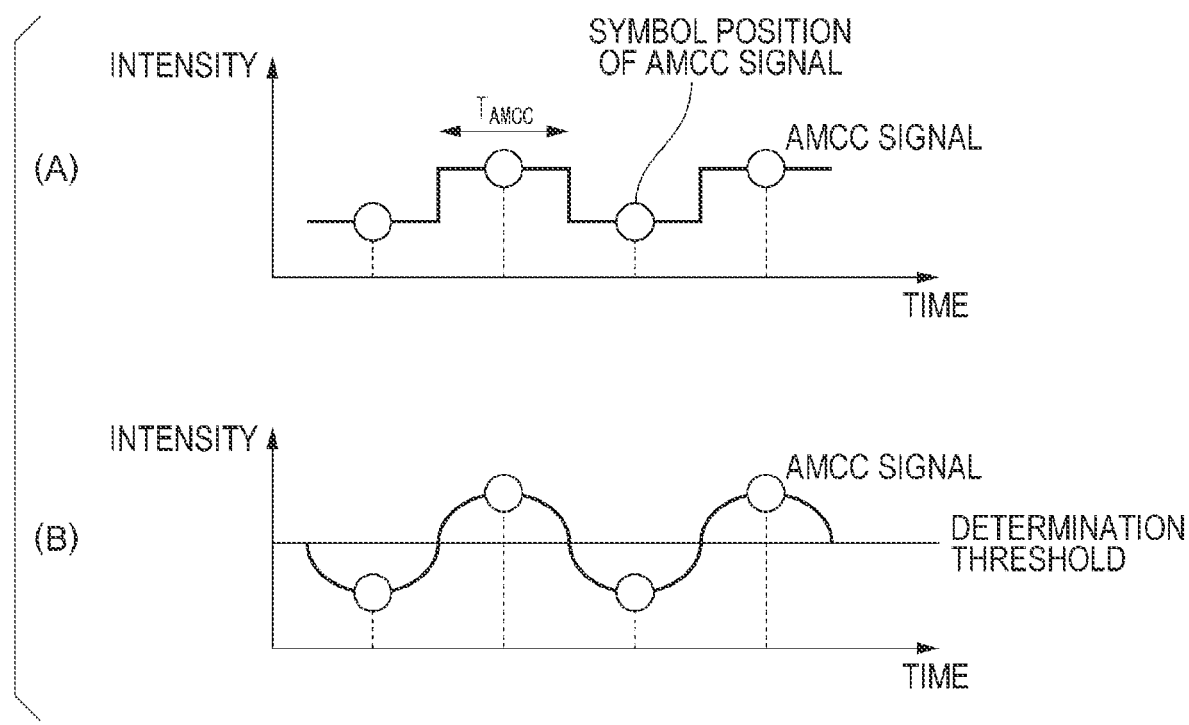
FIG. 13 is a diagram illustrating an example of a time waveform of an AMCC signal used in a coherent optical transmission system to which the coherent optical reception device of the fourth embodiment is applied.

FIG. 13 is a diagram illustrating an example of a time waveform of an AMCC signal used in a coherent optical transmission system 100 to which the coherent optical reception device 3 of the fourth embodiment is applied. Specifically, FIG. 13(A) illustrates an example in which the time waveform of the AMCC signal used in the coherent optical transmission system 100 to which the coherent optical reception device 3 of the fourth embodiment is applied is a rectangular wave, and FIG. 13(B) illustrates an example in which the time waveform of the AMCC signal used in the coherent optical transmission system 100 to which the coherent optical reception device 3 of the fourth embodiment is applied is other than the rectangular wave.

A symbol rate of the AMCC signal is defined as $f_{MACC}$, and a sampling rate before down-sampling is defined as $F_S$. A symbol period $T_{AMCC} = 1/f_{MACC}$ of the AMCC signal (see FIG. 13(A)). The number of samples of the symbol period is $T_{AMCC} \times F_S = F_S/f_{AMCC}$. Therefore, if $N = F_S/f_{AMCC}$, the movement average $I_{ave}(n)$ is at the AMCC symbol position, and the movement average section is the entire symbol period $T_{AMCC}$, so that the noise characteristic can be most improved. On the other hand, in the case of $N > F_S/f_{AMCC}$, as described above, the AMCC signal component decreases as the averaging number N increases. Therefore, the range of the averaging number N is $N \le F_S/f_{AMCC}$.

As illustrated in FIG. 13(B), in a case where the time waveform of the AMCC signal is other than a rectangular wave, the difference from the determination threshold is sufficiently large at the symbol position, and thus, the noise characteristic is good, but the difference from the determination threshold is small in other sections to be averaged, and as a result, the noise characteristic is deteriorated. As described above, in a case where the high frequency noise is suppressed by the movement average, it is effective to make the AMCC signal a rectangular wave as illustrated in FIG. 13(A) in order to enhance the noise characteristic.

Therefore, in the coherent optical transmission system 100 to which the coherent optical reception device 3 of the fourth embodiment is applied, the signal light received by the coherent receiver 32 performs intensity modulation corresponding to the AMCC signal, so that the AMCC signal is superimposed on the main signal and as illustrated in FIG. 13(A), a rectangular wave is used as the AMCC signal. In addition, in the high frequency component remover 34B2, the movement average calculator 34B22 calculates the movement average $I_{ave}(n)$ of the light intensity I(n) of the reception signal to remove the high frequency component included in the intensity component of the AMCC signal identification reception signal.

As above, the embodiments of the present invention have been described in detail with reference to the drawings. On the other hand, the specific configuration is not limited to the embodiments, and includes design and the like without departing from the spirit of the present invention.

INDUSTRIAL APPLICABILITY

The coherent optical reception device and the coherent optical reception method of the present invention are applicable to a coherent optical transmission system.

REFERENCE SIGNS LIST

100 Coherent optical transmission system
1 Coherent optical transmission device
11 Light source
12 Modulation signal generator
13 IQ modulator
13A Mach-Zehnder modulator
13B Mach-Zehnder modulator
13C π/2 phase difference setter
14 Modulation signal generator
15 Intensity modulator
16 Subcarrier generator
17 Multiplicator
18 Adder
19 Adder
1A Adder
1B Adder
2 Optical fiber
3 Coherent optical reception device
31 Local oscillation light generator
32 Coherent receiver
33 Analog-to-digital converter
34 Digital signal processor
34A Polarization combiner
34B AMCC signal identificator
34B1 Intensity calculator
34B2 High frequency component remover
34B21 Low pass filter
34B22 Movement average calculator
34B3 Down sampler
34B4 Determiner
34B5 Subcarrier component remover
34C Main signal identificator
34C1 Complex amplitude calculator
34C2 Equalization processor
34C3 Down sampler
34C4 Frequency offset compensator
34C5 Phase offset compensator
34C6 Determiner

The invention claimed is:

1. A coherent optical reception device comprising:
a coherent receiver that receives signal light in which an auxiliary management and control channel (AMCC) signal is superimposed on a main signal, converts the signal light into an analog electric signal, and outputs in-phase components and quadrature-phase components of a reception signal for each polarization state;
a polarization combiner that performs a first polarization combining on the in-phase components and performs a second polarization combining the quadrature-phase components of the reception signal output from the coherent receiver for each polarization state and outputs the reception signal as an AMCC signal identification reception signal that is the reception signal used for identification of the AMCC signal and a main signal identification reception signal that is the reception signal used for identification of the main signal; and
a digital signal processor that decodes a code sequence corresponding to the AMCC signal and a code sequence corresponding to the main signal from the reception signal by performing digital signal processing on the reception signal, wherein
the digital signal processor includes an AMCC signal identificator that identifies the AMCC signal and a main signal identificator that identifies the main signal,
the AMCC signal identificator includes an intensity calculator that calculates an absolute value of a complex amplitude as an intensity component of the AMCC signal identification reception signal output from the polarization combiner, and a high frequency component remover that removes a high frequency component included in the intensity component of the AMCC signal identification reception signal calculated by the intensity calculator, and
the main signal identificator includes a complex amplitude calculator that calculates a complex amplitude of the main signal identification reception signal output from the polarization combiner, and an equalization processor that performs equalization processing on the main signal identification reception signal.

2. The coherent optical reception device according to claim 1, further comprising:
an analog-to-digital converter that samples and discretizes the in-phase components and the quadrature-phase components of the reception signal output from the coherent receiver for each polarization state, wherein
the polarization combiner is included in the digital signal processor, and
the polarization combiner performs polarization combining on the in-phase components and the quadrature-phase components of the reception signal discretized by the analog-to-digital converter, outputs the reception signal to the AMCC signal identificator as the AMCC signal identification reception signal, and outputs the reception signal to the main signal identificator as the main signal identification reception signal.

3. The coherent optical reception device according to claim 2, wherein
the AMCC signal identificator includes
the intensity calculator that calculates an absolute value of a complex amplitude as the intensity component of the AMCC signal identification reception signal output from the polarization combiner,
the high frequency component remover,
a down sampler that extracts a symbol by performing down sampling on the intensity component from which the high frequency component has been removed by the high frequency component remover, and a determiner that demodulates a code sequence of the AMCC signal included in the signal light received by the coherent receiver by performing threshold determination.

4. The coherent optical reception device according to claim 1, wherein
the signal light received by the coherent receiver is signal light in which the AMCC signal is superimposed on the main signal by performing intensity modulation corresponding to the AMCC signal, and
the high frequency component remover removes the high frequency component included in the intensity component of the AMCC signal identification reception signal using a low pass filter.

5. The coherent optical reception device according to claim 3, wherein
the signal light received by the coherent receiver is signal light in which the AMCC signal is superimposed on the main signal by multiplying the AMCC signal by a subcarrier and performing intensity modulation corresponding to the AMCC signal,
the AMCC signal identificator includes a subcarrier component remover that removes a subcarrier component,
the down sampler performs down-sampling on the AMCC signal identification reception signal after the subcarrier component remover removes the subcarrier component, and
the determiner performs the threshold determination after the subcarrier component remover removes the subcarrier component.

6. The coherent optical reception device according to claim 1, wherein
the signal light received by the coherent receiver is signal light in which the AMCC signal is superimposed on the main signal by performing intensity modulation corresponding to the AMCC signal, and
the intensity modulation corresponding to the AMCC signal is performed in an IQ modulator on which IQ modulation corresponding to the main signal is performed.

7. A coherent optical reception method comprising:
receiving signal light in which an auxiliary management and control channel (AMCC) signal is superimposed on a main signal, converting the signal light into an analog electric signal, and outputting an in-phase components and quadrature-phase components of a reception signal for each polarization state; and
performing a first polarization combining on the in-phase components and performing a second polarization combining the quadrature-phase components of the reception signal output for each polarization state and outputting the reception signal as an AMCC signal identification reception signal that is the reception signal used for identification of the AMCC signal and a main signal identification reception signal that is the reception signal used for identification of the main signal;
decoding a code sequence corresponding to the AMCC signal and a code sequence corresponding to the main signal from the reception signal by performing digital signal processing on the reception signal;
identifying the AMCC signal;
identifying the main signal;
calculating an absolute value of a complex amplitude as an intensity component of the AMCC signal identification reception signal output;
removing a high frequency component included in the intensity component of the AMCC signal identification reception signal calculated;
calculating a complex amplitude of the main signal identification reception signal output; and
performing equalization processing on the main signal identification reception signal.

* * * * *